US008873472B2

(12) United States Patent
Kang et al.

(10) Patent No.: US 8,873,472 B2
(45) Date of Patent: Oct. 28, 2014

(54) SYSTEM AND METHOD FOR ALLOCATING RESOURCES IN A COMMUNICATION SYSTEM

(75) Inventors: Hee-Won Kang, Seongnam-si (KR); Hwa-Sun You, Suwon-si (KR); Young-Bo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1356 days.

(21) Appl. No.: 12/258,918

(22) Filed: Oct. 27, 2008

(65) Prior Publication Data

US 2009/0122754 A1    May 14, 2009

(30) Foreign Application Priority Data

Nov. 13, 2007    (KR) .................... 10-2007-0115500

(51) Int. Cl.
*H04W 4/00* (2009.01)
*H04W 72/00* (2009.01)
*H04W 72/04* (2009.01)

(52) U.S. Cl.
CPC .................................. *H04W 72/042* (2013.01)
USPC ........................................ 370/329; 455/452.1

(58) Field of Classification Search
CPC ............ H04W 72/04; H04W 72/0406; H04W 72/042
See application file for complete search history.

(56) References Cited

U.S. PATENT DOCUMENTS

| | | | |
|---|---|---|---|
| 6,243,365 B1 * | 6/2001 | Mansfield et al. ............ | 370/310 |
| 6,516,350 B1 * | 2/2003 | Lumelsky et al. ............ | 709/226 |
| 7,237,200 B2 * | 6/2007 | Wisniewski .................. | 715/751 |
| 7,522,637 B2 * | 4/2009 | Kim et al. ...................... | 370/480 |
| 7,751,364 B2 * | 7/2010 | Won et al. ..................... | 370/329 |
| 7,783,742 B2 * | 8/2010 | Saha et al. .................... | 709/224 |
| 7,873,364 B2 * | 1/2011 | Park et al. ..................... | 455/450 |
| 7,894,389 B2 * | 2/2011 | Hyon et al. ................... | 370/329 |
| 7,916,688 B2 * | 3/2011 | Kaneko et al. ................ | 370/328 |
| 7,948,944 B2 * | 5/2011 | Li et al. ......................... | 370/330 |

(Continued)

FOREIGN PATENT DOCUMENTS

KR    10-2007-0075839 A    7/2007

OTHER PUBLICATIONS

U.S. Appl. No. 60/721,451, filed Sep. 28, 2005, Method and Apparatus for Multi-Carrier Packet Communication with Reduced Overhead.*

(Continued)

*Primary Examiner* — Gregory Sefcheck
(74) *Attorney, Agent, or Firm* — Jefferson IP Law, LLP

(57) ABSTRACT

A method and system for allocating resources in a communication system are provided. The system includes a Base Station (BS) for allocating persistent resources included in a persistent resource area to one or more a Mobile Stations (MS) using the persistent resource area, for allocating an Identifier (ID) indicating an allocation order of the persistent resources to each of the one or more the MS using the persistent resource area, for transmitting resource allocation information including the ID and the number of slots included in the persistent resources to each of the one or more MSs using the persistent resource area, and for allocating dynamic resources to one or more MSs using a dynamic resource area, after the persistent resource allocation is completed for all of the one or more MSs using the persistent resource area. The persistent resource area includes successive persistent resources along a time axis and along a frequency axis.

16 Claims, 8 Drawing Sheets

(56) References Cited

U.S. PATENT DOCUMENTS

| | | | |
|---|---|---|---|
| 7,957,260 B2* | 6/2011 | Joung et al. | 370/208 |
| 8,139,532 B2* | 3/2012 | Lim et al. | 370/329 |
| 8,150,404 B2* | 4/2012 | Gollamudi | 455/450 |
| 8,175,032 B2* | 5/2012 | Olfat | 370/328 |
| 8,190,164 B2* | 5/2012 | So | 455/450 |
| 8,204,008 B2* | 6/2012 | McCoy et al. | 370/329 |
| 8,310,988 B2* | 11/2012 | Ryu et al. | 370/328 |
| 8,363,607 B2* | 1/2013 | Khandekar et al. | 370/329 |
| 8,391,777 B2* | 3/2013 | Li et al. | 455/7 |
| 8,412,209 B2* | 4/2013 | Whinnett et al. | 455/450 |
| 2003/0110205 A1* | 6/2003 | Johnson | 709/104 |
| 2007/0149198 A1* | 6/2007 | Park et al. | 455/436 |
| 2007/0155397 A1* | 7/2007 | Park et al. | 455/453 |
| 2007/0155398 A1* | 7/2007 | Park et al. | 455/453 |
| 2008/0020778 A1* | 1/2008 | Pi | 455/450 |
| 2008/0075032 A1* | 3/2008 | Balachandran et al. | 370/317 |
| 2008/0102848 A1* | 5/2008 | Jung et al. | 455/450 |
| 2008/0233964 A1* | 9/2008 | McCoy et al. | 455/450 |
| 2009/0116427 A1* | 5/2009 | Marks et al. | 370/328 |
| 2009/0219853 A1* | 9/2009 | Hart et al. | 370/315 |
| 2009/0232084 A1* | 9/2009 | Li et al. | 370/330 |
| 2009/0285163 A1* | 11/2009 | Zhang et al. | 370/329 |

OTHER PUBLICATIONS

U.S. Appl. No. 60/792,486, filed Apr. 17, 2006, Data Communication Systems and Methods, Fong et al.*

* cited by examiner

SYSTEM AND METHOD FOR ALLOCATING RESOURCES IN A COMMUNICATION SYSTEM

PRIORITY

This application claims the benefit under 35 U.S.C. §119 (a) of a Korean patent application filed in the Korean Intellectual Property Office on Nov. 13, 2007 and assigned Serial No. 2007-115500, the entire disclosure of which is hereby incorporated by reference.

BACKGROUND OF THE INVENTION

1. Field of the Invention

The present invention relates to a communication system. More particularly, the present invention relates to a system and method for allocating resources in a communication system.

2. Description of the Related Art

Communication systems are under development to provide various high-speed, large-capacity services to Mobile Stations (MSs). Examples of the communication systems under development include Institute of Electrical and Electronics Engineers (IEEE) 802.16 and Mobile Worldwide Interoperability for Microwave Access (WiMAX). Mobile WiMAX is based on IEEE 802.16.

With reference to FIG. 1, a frame structure for a conventional IEEE 802.16 communication system will be described below.

FIG. 1 illustrates a frame structure for a conventional IEEE 802.16 communication system.

Referring to FIG. 1, a frame 100 includes a DownLink (DL) subframe 110, a Transmit/Receive Transition Gap (TTG) 150, an UpLink (UL) subframe 160, and a Receive/Transmit Transition Gap (RTG) 190.

The DL subframe 110 includes a Frame Control Header (FCH) region 111, a DL_MAP region 120, a UL_MAP region 130, and a DL burst region 140. The DL_MAP region 120 includes a Generic Management Header (GMH) region 113, a DL_MAP Information Element (IE) region, and a Cyclic Redundancy Check (CRC) region 121. The UL_MAP region 130 includes a GMH region 131, a UL_MAP IE region, and a CRC region 139.

The UL subframe 160 includes a control region 170 and a UL data burst region 180. The control region 170 has a Channel Quality Indication CHannel (CQICH) region 171, an ACKnowledgment (ACK) region 173, and a Code Division Multiple Access (CDMA) ranging region 175.

Meanwhile, a DL_MAP message is transmitted in the DL_MAP 120 and a UL_MAP message is transmitted in the UL_MAP region 130. DL data bursts are delivered in the DL data burst region 140 and UL data bursts are delivered in the UL data burst region 180.

The DL_MAP IE region includes a plurality of DL_MAP IEs 115, 117 and 119 (DL_MAP IE #1, DL_MAP IE #2, and DL_MAP IE #3) carrying information about the DL data burst region 140. DL_MAP IE #1 115 delivers information about a first DL data burst 141 (DL data burst #1), DL_MAP IE #2 117 delivers information about a second DL data burst 143 (DL data burst #2), and DL_MAP IE #3 119 delivers information about a third DL data burst 145 (DL data burst #3). The UL_MAP IE region includes a plurality of UL_MAP IEs 133, 135 and 137 (UL_MAP IE #1, UL_MAP IE #2, and UL_MAP IE #3) carrying information about the UL data burst region 180. UDL_MAP IE #1 133 delivers information about a first UL data burst 181 (UL data burst #1), UL_MAP IE #2 135 delivers information about a second UL data burst 183 (UL data burst #2), and UL_MAP IE #3 137 delivers information about a third UL data burst 185 (UL data burst #3).

Therefore, a Base Station (BS) allocates resources to an MS, for DL/UL data transmission and reception, and notifies the MS of information about the resources by a resource allocation message. The resource allocation message can be one of a DL_MAP message and a UL_MAP message. The DL_MAP message and the UL_MAP message are transmitted according to a frame period.

In the case of a service that transmits data to an MS periodically, for example, Voice over Internet Protocol (VoIP), a BS's transmission of a resource allocation message every frame to transmit resource allocation information to the MS leads to unnecessary resource consumption. Accordingly, it is preferable to allocate resources to the MS in a persistent manner, when a periodic data transmission service like VoIP is provided. This is referred to as persistent resource allocation.

In the persistent resource allocation scheme, when the BS initially allocates resources to the MS, the MS can use the allocated resources continuously without receiving a resource allocation message in every frame. If the allocated resources are changed or released, the BS can notify the MS of the change or release by another resource allocation message. Because the persistent resource allocation obviates the need for transmitting a resource allocation message in every frame, resources are saved.

FIG. 2 illustrates a resource allocation method in a conventional IEEE 802.16 communication system.

While both dynamic resource allocation and persistent resource allocation are illustrated in FIG. 2, the dynamic resource allocation will not be described in detail herein. For the sake of convenience', dynamically allocated resources are referred to as 'dynamic resources' and persistently allocated resources are referred to as 'persistent resources'. When resources are allocated for UL/DL data bursts in a UL/DL subframe by the dynamic resource allocation scheme, it is assumed that the resources are allocated in slots.

Referring to FIG. 2, persistent resources A include two forward slots starting with slot 9, persistent resources B include four forward slots starting from slot 11, persistent resources C include six forward slots starting with slot 15, and persistent resources D include four forward slots starting from slot 25. A direction from slot 9,10,11 and 12 is along a time axis, and a direction from slot 9,13,17 and 25 is along a frequency axis.

The above persistent resource allocation illustrated in FIG. 2 may decrease resource efficiency. With reference to FIG. 3, a case of decreasing resource efficiency will be described.

FIG. 3 illustrates an allocation of new persistent resources after a release of existing persistent resources in a conventional IEEE 802.16 communication system.

Referring to FIG. 3, it is assumed that after the persistent resources B and the persistent resources D illustrated in FIG. 2 are released, the new persistent resources E including eight slots are required. Since the number of slots included in the persistent resources E exceeds that of the released persistent resources B or D, i.e. 4, the persistent resources E need new slots other than the slots of the persistent resources B or D. The persistent resources E include eight forward slots starting with slot 29.

Consequently, the eight slots of the released persistent resources B and D, the four forward slots starting with slot 11 and four forward slots starting with slot 25 for example, are holes that are unavailable resources.

As described above, the persistent resource allocation scheme may cause non-successive resource allocation due to the creation of holes. The resulting decrease in resource efficiency in turn decreases the efficiency of the IEEE 802.16 communication system.

SUMMARY OF THE INVENTION

An aspect of the present invention is to address at least the above-mentioned problems and/or disadvantages and to provide at least the advantages described below. Accordingly, an aspect of the present invention is to provide a system and method for allocating resources in order to prevent a creation of holes in a communication system using persistent resource allocation.

In accordance with an aspect of the present invention, a method for allocating resources in a BS in a communication system is provided. The method includes allocating persistent resources included in a persistent resource area to one or more MSs using the persistent resource area, allocating an ID indicating an allocation order of the persistent resources to each of the one or more MSs using the persistent resource area, transmitting resource allocation information including the ID and the number of slots included in the persistent resources to each of the one or more MSs using the persistent resource area, and allocating dynamic resources to one or more MSs using a dynamic resource area, after the persistent resource allocation is completed for all of the one or more MSs using the persistent resource area. The persistent resource area includes successive persistent resources along a time axis and along a frequency axis.

In accordance with another aspect of the present invention, a method for allocating resources in an MS in a communication system is provided. The method includes receiving a first ID indicating an allocation order of first persistent resources from a BS, when the BS allocates the first persistent resources in a persistent resource area, receiving first resource allocation information including the first ID and the number of slots included in the first persistent resources from the BS, comparing, upon receipt of second resource allocation information including a second ID of second persistent resources released from the persistent resource area and the number of slots included in the second persistent resources, the second ID with the first ID, and shifting positions of the slots included in the first persistent resources in a reverse order by the number of the slots included in the second persistent resources, if the first ID indicates a later allocation order than the second ID.

In accordance with a further aspect of the present invention, a system for allocating resources in a communication system is provided. The system includes a BS for allocating persistent resources included in a persistent resource area to one or more a MS using the persistent resource area, for allocating an ID indicating an allocation order of the persistent resources to each of the one or more the MS using the persistent resource area, for transmitting resource allocation information including the ID and the number of slots included in the persistent resources to each of the one or more MSs using the persistent resource area, and for allocating dynamic resources to one or more MSs using a dynamic resource area, after the persistent resource allocation is completed for all of the one or more MSs using the persistent resource area. The persistent resource area includes successive persistent resources along a time axis and along a frequency axis.

In accordance with still another aspect of the present invention, a system for allocating resources in a communication system is provided. The system includes an MS for receiving a first ID indicating an allocation order of first persistent resources from a BS, when the BS allocates the first persistent resources in a persistent resource area, for receiving first resource allocation information including the first ID and the number of slots included in the first persistent resources from the BS, for comparing, upon receipt of second resource allocation information including a second ID of second persistent resources released from the persistent resource area and the number of slots included in the second persistent resources, the second ID with the first ID, and for shifting positions of the slots included in the first persistent resources in a reverse order by the number of the slots included in the second persistent resources, if the first ID indicates a later allocation order than the second ID.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Exemplary embodiments of the present invention provide a system and method for allocating resources according to a persistent resource allocation scheme, so that holes are not created and thus resource efficiency is increased. While the exemplary embodiments of present invention are described in the context of an Institute of Electrical and Electronics Engineers (IEEE) 802.16 communication system, the present invention is also applicable to other communication systems based on Orthogonal Frequency Division Multiple Access (OFDMA).

Figure 1:
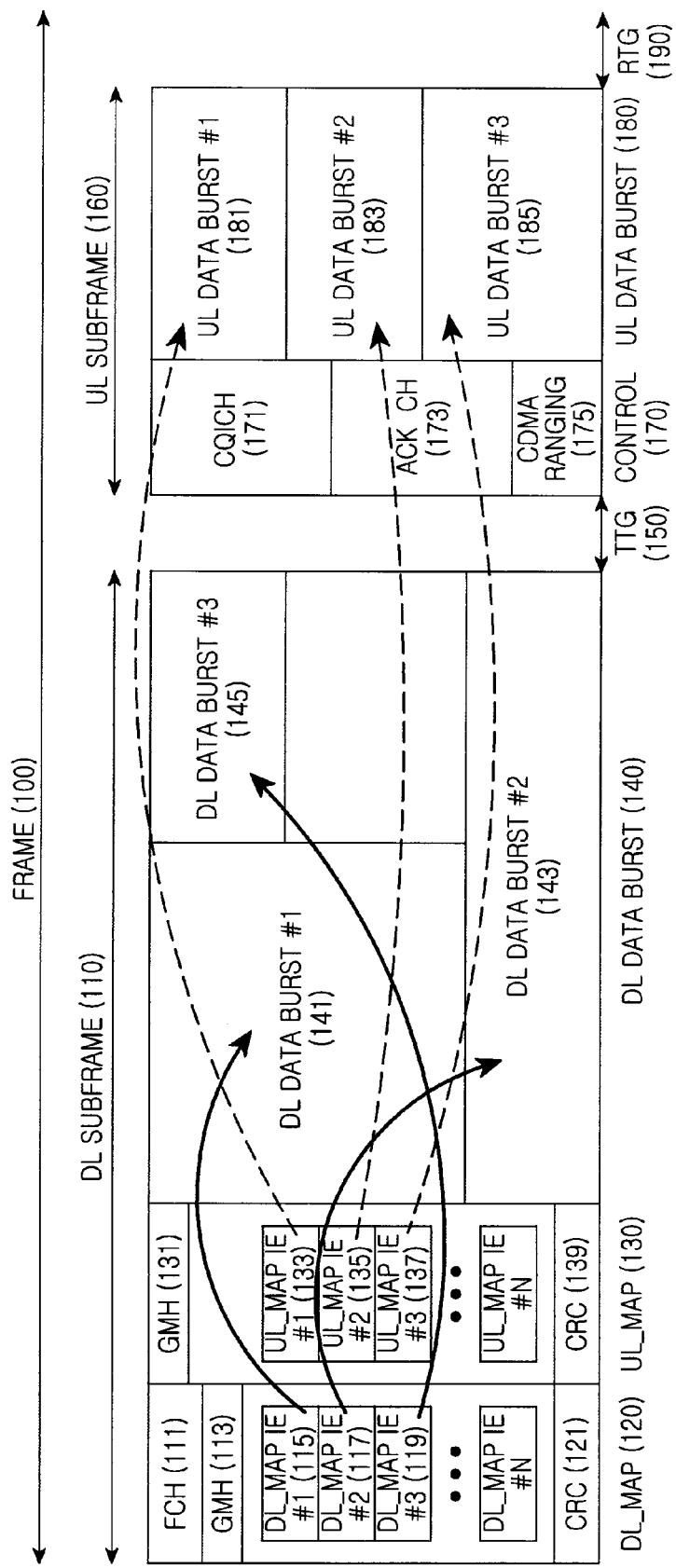
FIG. 1 illustrates a frame structure for a conventional Institute of Electrical and Electronics Engineers (IEEE) 802.16 communication system.
Figure 2:
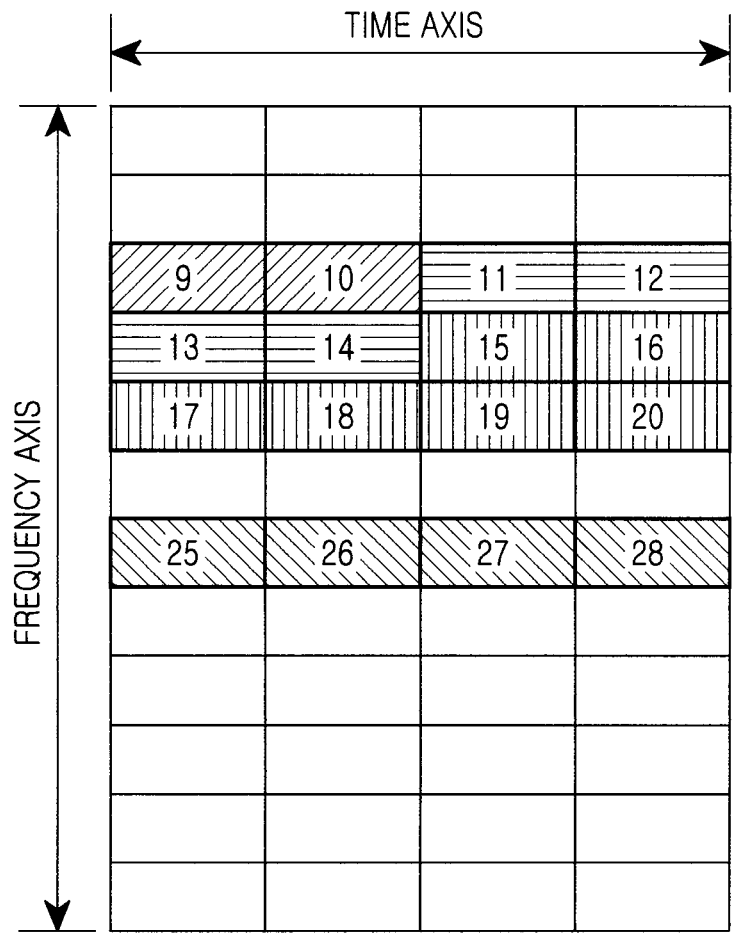
FIG. 2 illustrates a resource allocation method in a conventional IEEE 802.16 communication system.
Figure 2:
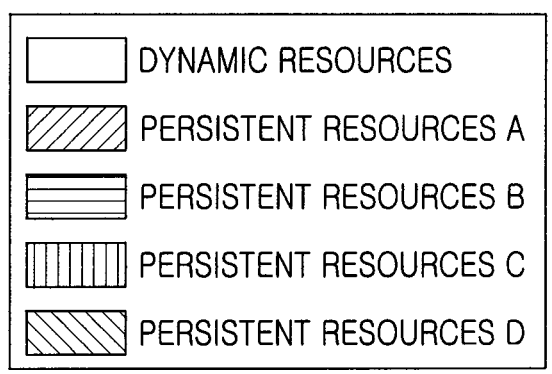
Figure 3:
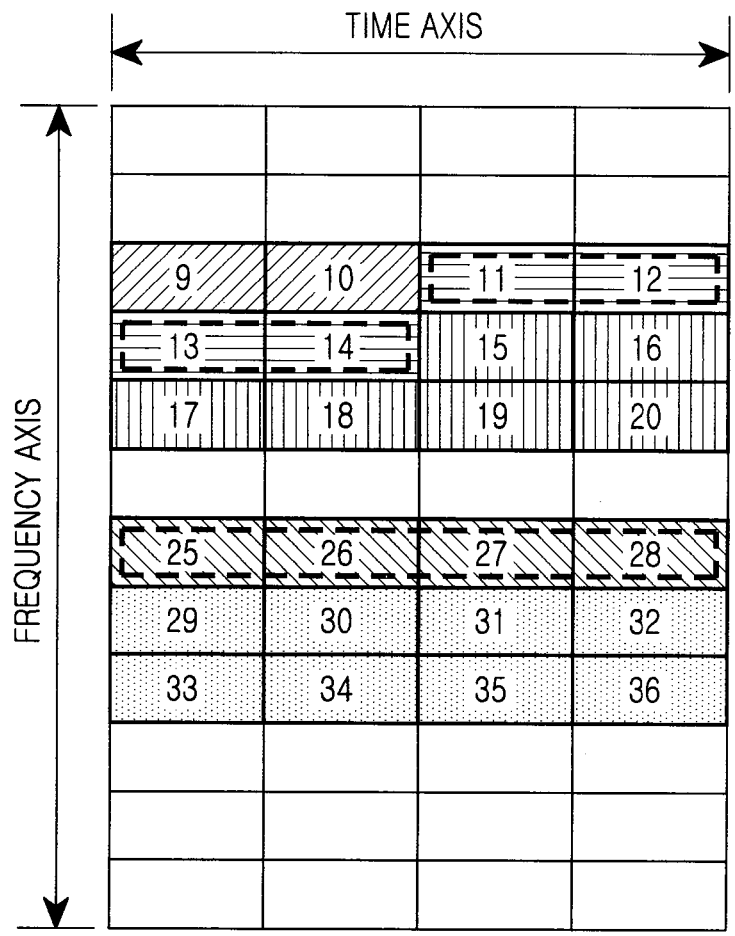
FIG. 3 illustrates an allocation of new persistent resources after existing persistent resources and a release of existing persistent resources in a conventional IEEE 802.16 communication system.
Figure 3:
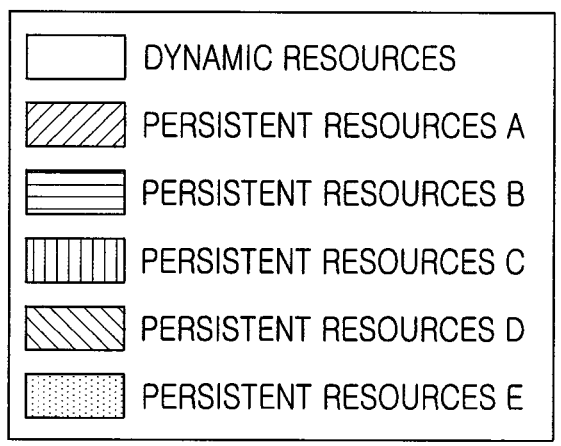
Figure 4:
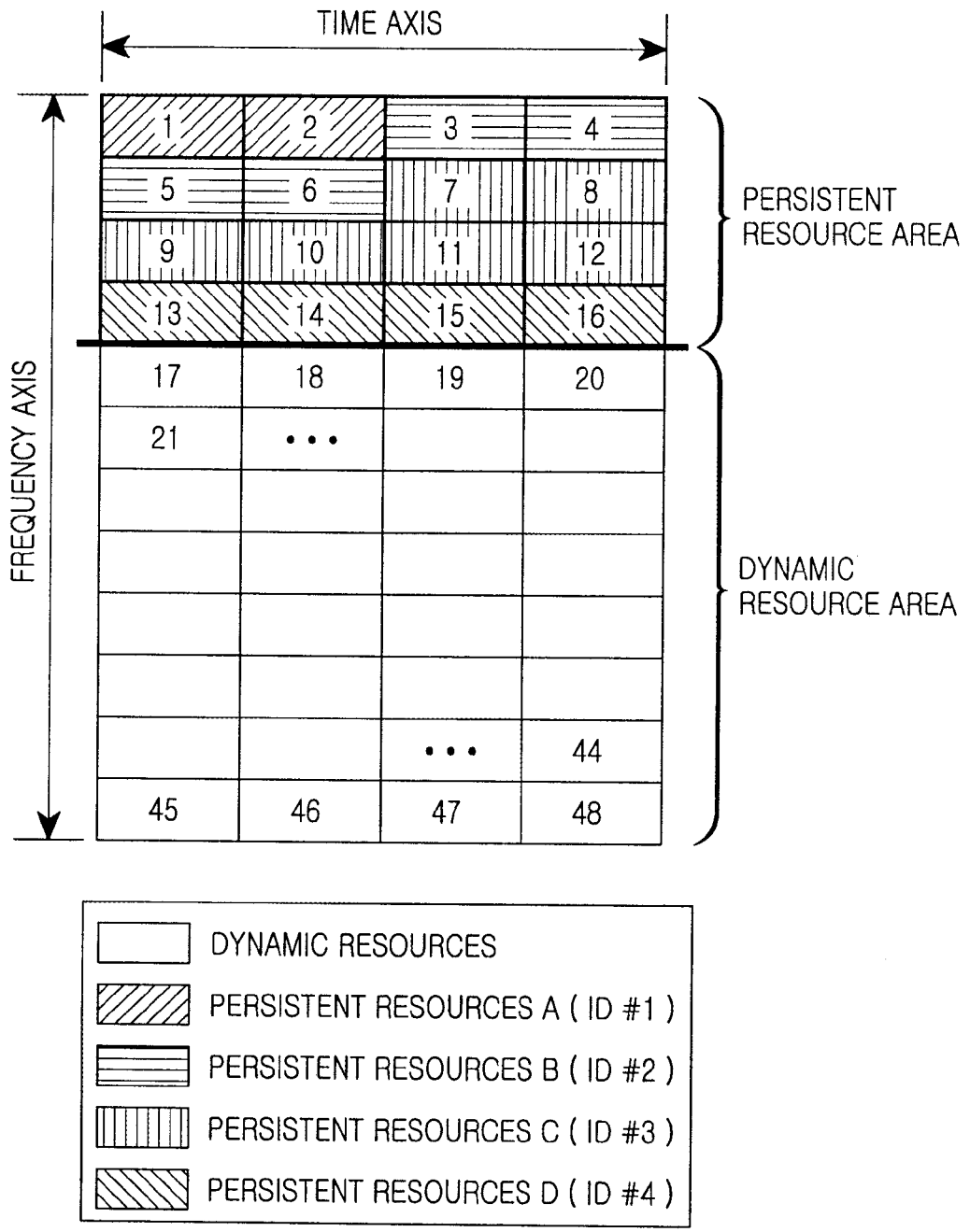
FIG. 4 illustrates a resource allocation method in an IEEE 802.16 communication system according to an exemplary embodiment of the present invention.

FIG. 4 illustrates a resource allocation method in an IEEE 802.16 communication system according to an exemplary embodiment of the present invention.

While both dynamic resource allocation and persistent resource allocation are illustrated in FIG. 4, the dynamic resource allocation will not be described in detail herein. For the sake of convenience, dynamically allocated resources are referred to as 'dynamic resources' and persistently allocated resources are referred to as 'persistent resources'.

A Base Station (BS) prioritizes all connections of Mobile Stations (MSs) and first allocates persistent resources to MSs using persistent resources according to their priority levels. Simultaneously with the persistent resource allocation, the BS allocates Identifiers (IDs) indicating the order of allocated resources. When the persistent resource allocation is completed, the BS then allocates dynamic resources to MSs using dynamic resources according to their priority levels.

Referring to FIG. 4, persistent resources A have two forward slots starting with slot 1, persistent resources B have four forward slots starting with slot 3, persistent resources C have six forward slots starting from slot 7, and persistent resources D have four forward slots starting from slot 13. The BS allocates ID #1 to an MS having the persistent resources A, ID #2 to an MS having the persistent resources B, ID #3 to an MS having the persistent resources C, and ID #4 to an MS having the persistent resources D. The persistent resources of slot 1 to slot 16 are allocated to the MSs according to their priority levels and ID #1 to ID #4 indicate the allocation order of the persistent resources.

When the persistent resource allocation is completed for the MSs using persistent resources, dynamic resource allocation starts. Hence, the subsequent slots to slot 17 in the forward direction are included in the dynamic resources. That is, the resources of slot 1 to slot 16 are persistent resources and resources of slot 17 to slot 48 are dynamic resources. In this manner, the persistent resource area is separated from the dynamic resource area according to an exemplary embodiment of the present invention. Therefore, a maximum dynamic resource area is secured and resource allocation freedom is increased.

Figure 5:
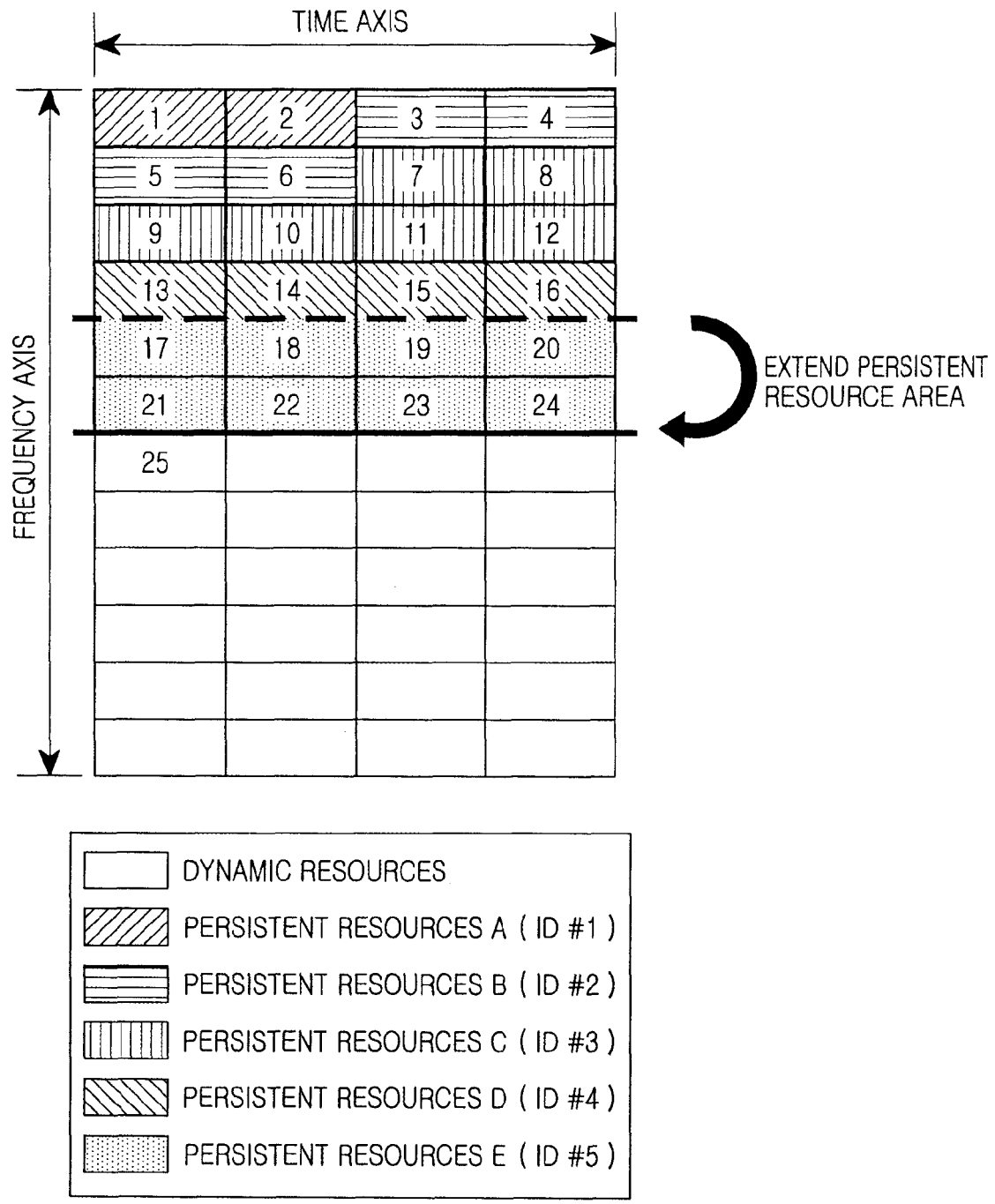
FIG. 5 illustrates a method for allocating new persistent resources in an IEEE 802.16 communication system according to an exemplary embodiment of the present invention.

With reference to FIG. 5, a description will be made of a case of allocating new persistent resources, for example, persistent resources E after the persistent resource allocation is completed, on the assumption that the persistent resources include eight slots.

FIG. 5 illustrates a method for allocating new persistent resources in an IEEE 802.16 communication system according to an exemplary embodiment of the present invention.

When the BS receives a request for allocation of new persistent resources other than already-allocated persistent resources from a new MS, it allocates the new persistent resources together with an ID to the new MS. Then, the BS transmits resource allocation information to the new MS.

Referring to FIG. 5, the persistent resources E include eight forward slots starting with the next slot to slot 16 included in the persistent resources D, that is, slot 17. The BS allocates the ID following ID #4 allocated to the persistent resources D, i.e. ID #5 to the new MS having the persistent resources E. Then the BS transmits information about the allocated ID and resource allocation information about the allocated persistent resources E to all MSs using persistent resources and the new MS to which the persistent resources E are allocated. The resource allocation information indicates the number of slots included in the persistent resources E. Forward slots starting with slot 25 are dynamic resources.

Figure 6:
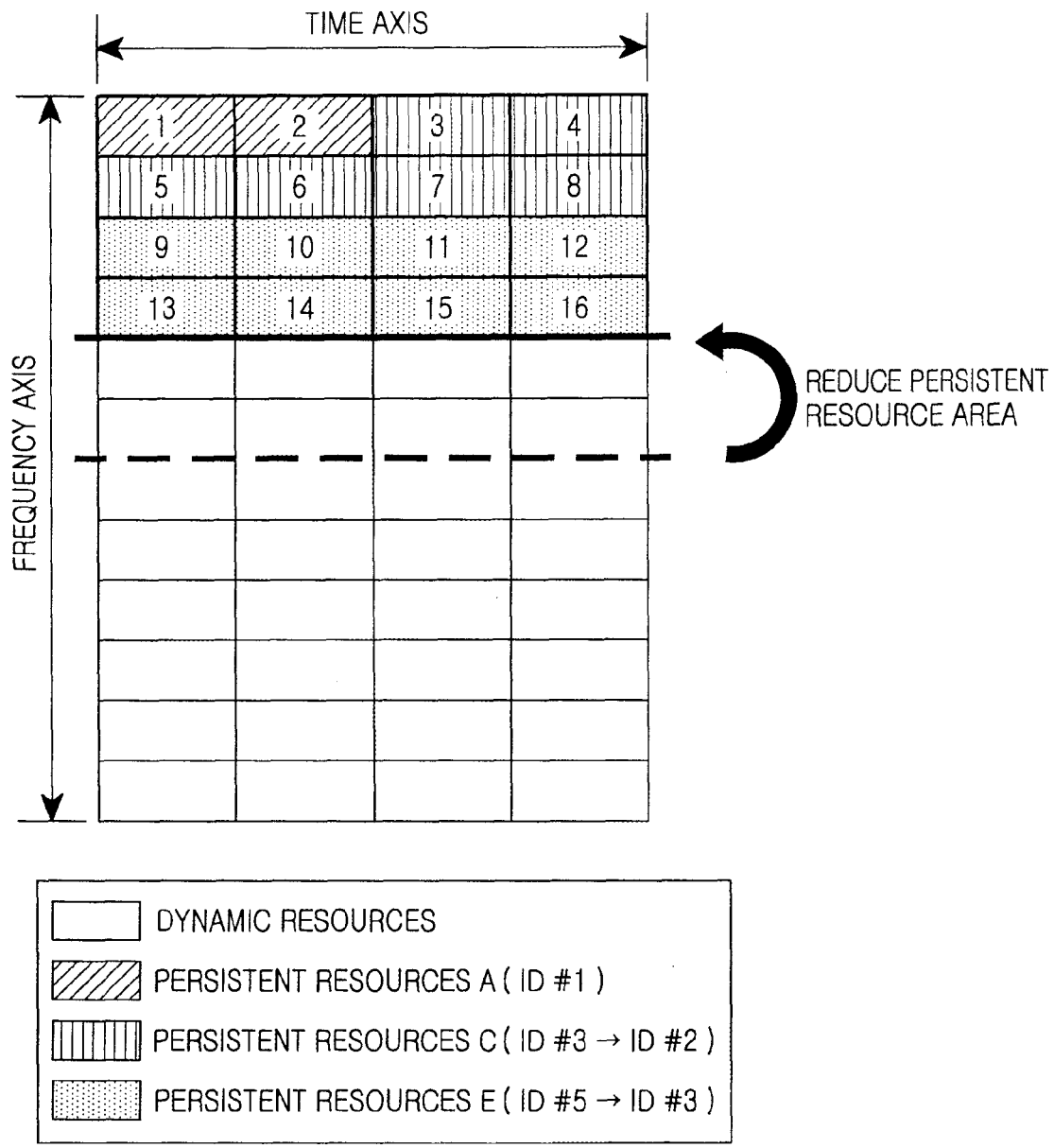
FIG. 6 illustrates a method for releasing allocated persistent resources in an IEEE 802.16 communication system according to an exemplary embodiment of the present invention.

In the illustrated case of FIG. 5, the persistent resource area is extended due to the allocation of new persistent resources. In another case, the persistent resource area can be reduced. With reference to FIG. 6, a case will be described below where some of the allocated resources A to E illustrated in FIG. 5, for example, the persistent resources B and D, are released.

FIG. 6 illustrates a method for releasing allocated persistent resources in an IEEE 802.16 communication system according to an exemplary embodiment of the present invention.

When the BS detects to release already-allocated persistent resources, it transmits resource allocation information of an MS from which the persistent resources are released to all MSs using persistent resources. The resource allocation information includes the ID and the number of slots included in the released persistent resources of the MS. Upon receipt of the resource allocation information, each MS compares its ID with the ID included in the resource allocation information. If the ID of the MS is allocated later than ID included in the resource allocation information, the MS detects the number of slots of the released persistent resources and shifts the positions of slots of its persistent resources in a reverse direction by as much as the detected slot number. The BS then allocates a new ID to the MS because the order of the resource allocation has changed due to the resource release.

Referring to FIG. 6, when the BS detects a release of the persistent resources B and D, it transmits resource allocation information (ID #2 and the number of slots, 4) about the persistent resources B and resource allocation information (ID #4 and the number of slots, 4) about the persistent resources D to all MSs using persistent resources. Because ID #3 of the persistent resources C is allocated later than ID #2 of the persistent resources B, the MS using the persistent resources C shifts the positions of the slots included in the persistent resources C in a reverse direction by the number of the slots of the persistent resources B, i.e. four slots. As a result, the persistent resources C include six forward slots starting with slot 3. The BS then allocates ID #2 that was the ID of the persistent resources B to the MS using the persistent resources C because of the release of the persistent resources B.

In the mean time, ID #5 of the persistent resources E is also allocated later than ID #4 of the persistent resources D, the MS using the persistent resources E shifts the positions of the slots included in the persistent resources E in a reverse direction by the number of the slots of the persistent resources E, i.e. four slots. As a result, the persistent resources E include four forward slots starting with slot 9. The BS then allocates ID #3 to the MS using the persistent resources E because of the release of the persistent resources B and D.

Figure 7:
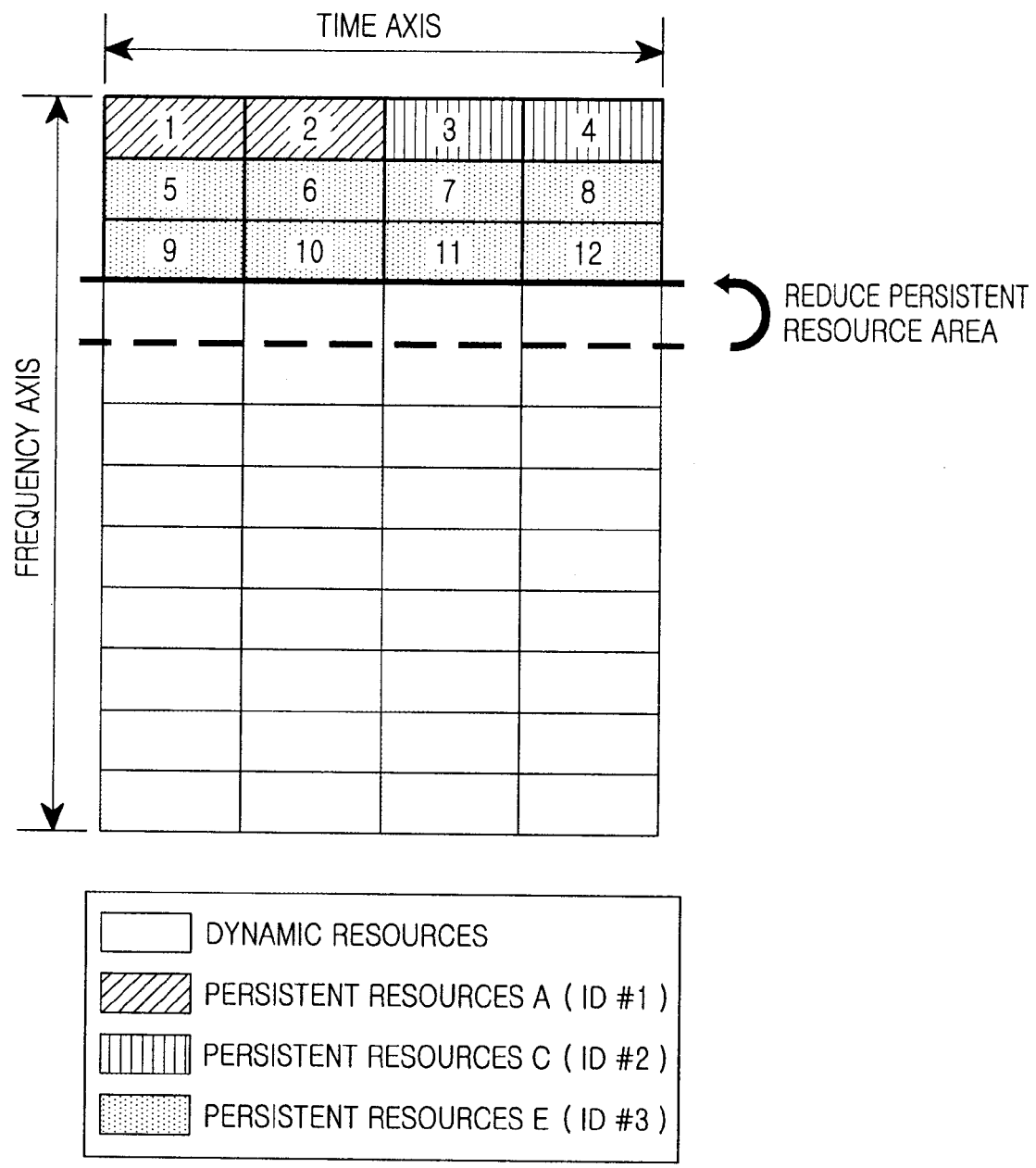
FIG. 7 illustrates a method for changing allocated persistent resources in an IEEE 802.16 communication system according to an exemplary embodiment of the present invention.

In the illustrated case of FIG. 6, the persistent resource area is reduced due to a release of the allocated persistent resources. With reference to FIG. 7, a case will be described below where the number of slots in some of the allocated resources illustrated in FIG. 6, for example, the number of slots in the persistent resources C, decreases from six to two.

FIG. 7 illustrates a method for changing allocated persistent resources in an IEEE 802.16 communication system according to an exemplary embodiment of the present invention.

When the BS detects to change already-allocated persistent resources, it transmits resource allocation information of an MS with the changed persistent resources to all MSs using persistent resources. The resource allocation information includes the ID and a change in the number of slots included in the changed persistent resources of the MS. The change in the number of slots indicates a slot increment or decrement in the changed persistent resources with respect to the original persistent resources.

Upon receipt of the resource allocation information, each MS compares its ID with the ID included in the resource allocation information. If the ID of the MS is allocated later than the ID included in the resource allocation information, the MS detects the slot increment or decrement and shifts the positions of the slots of its persistent resources by as much as the detected slot number. In the case of a slot increment, the MS shifts the positions of the slots of its persistent resources in a forward direction by the detected slot number. In the case of a slot decrement, the MS shifts the positions of the slots of its persistent resources in a reverse direction by the detected slot number.

Referring to FIG. 7, when the BS detects a change of the persistent resources C, it transmits resource allocation information including ID #2 of the persistent resources C and the number of slots reduced from the persistent resources C, i.e. 4, to all MSs using persistent resources. Because ID #3 of the persistent resources E is larger than ID #2 of the persistent resources C, the MS using the persistent resources E shifts the positions of the slots included in the persistent resources E in a reverse direction by four slots. As a result, the persistent resources E include eight forward slots starting with slot 5 following slot 4 included in the persistent resources C.

Figure 8:
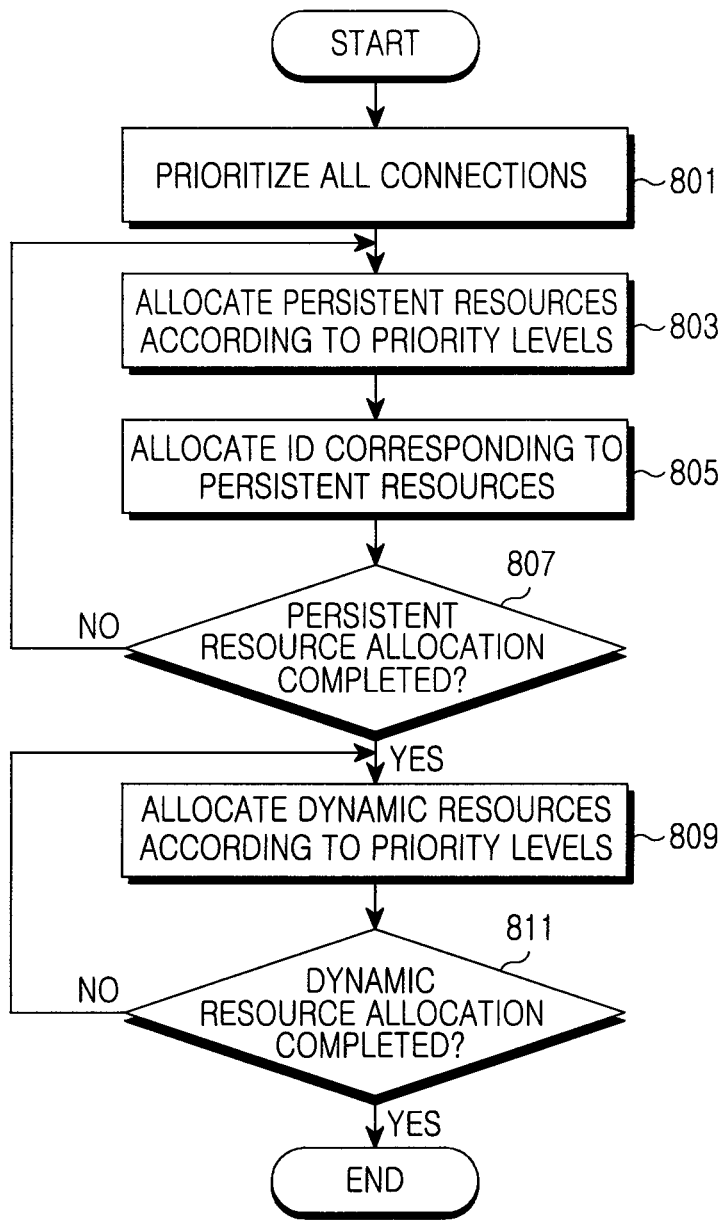
FIG. 8 is a flowchart illustrating an operation for allocating resources in a Base Station (BS) in a communication system according to an exemplary embodiment of the present invention.

FIG. 8 is a flowchart illustrating an operation for allocating resources to MSs in a BS in a communication system according to an exemplary embodiment of the present invention.

Referring to FIG. 8, the BS prioritizes all connections of MSs in step 801 and allocates persistent resources to MSs using persistent resources according to their priority levels in step 803. In step 805, the BS allocates IDs to the MSs to which the persistent resources are allocated according to their allocation order. The BS determines whether the persistent resource allocation is completed for the MSs using persistent resources in step 807.

If the persistent resource allocation is not completed, the BS returns to step 803 to allocate persistent resources to an MS with the next priority level. When the persistent resource allocation is completed for the MSs using persistent resources, the BS allocates dynamic resources to MSs using dynamic resources in step 809 and determines whether the dynamic resource allocation is completed for all MSs using dynamic resources in step 811. If the dynamic resource allocation is not completed, the BS returns to step 809 to allocate dynamic resources to an MS with the next priority level. When the dynamic resource allocation is completed for the MSs using dynamic resources, the BS ends the procedure.

As is apparent from the above description, exemplary embodiments of the present invention advantageously enable resource allocation without holes when resources are allocated according to a persistent resource allocation scheme in a communication system. As a result, the resource efficiency of the communication system increases.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for allocating resources in a Base Station (BS) in a communication system, the method comprising:
   allocating persistent resources included in a persistent resource area to one or more Mobile Stations (MSs) based on a priority of a connection of each of the one or more MSs;
   transmitting resource allocation information including an IDentifier (ID) which indicates an allocation order of a related persistent resource being allocated to each of the one or more MSs and a number of slots included in the related persistent resource to the one or more MSs; and
   transmitting resource allocation information including an ID which indicates an allocation order of a specific persistent resource being allocated to a specific MS and a number of slots included in the specific persistent resource to the one or more MSs if the specific persistent resource is released from a persistent resource area,
   wherein an ID indicating an allocation order of at least one persistent resource followed by the released specific persistent resource is changed.

2. The method of claim 1, wherein the persistent resource area includes successive persistent resources along a time axis and along a frequency axis.

3. The method of claim 1, further comprising, allocating dynamic resources included in a dynamic resource area to the one or more MSs based on a priority if an allocation of the persistent resources included in the persistent resource area is completed.

4. The method of claim 1, wherein the persistent resource area has a variable size.

5. A method for allocating resources in a Mobile Station (MS) in a communication system, the method comprising:
   receiving resource allocation information including an IDentifier (ID) which indicates an allocation order of a related persistent resource being allocated to each of one or more MSs and a number of slots included in the related persistent resource from a Base Station (BS) if the BS allocates persistent resource included in a persistent resource area to the one or more MSs based on a priority of a connection of each of the one or more MSs;
   receiving resource allocation information including a specific ID which indicates an allocation order of a specific persistent resource being allocated to a specific MS and a number of slots included in the specific persistent resource from the BS, if the specific persistent resource is released from the persistent resource area; and
   transmitting a signal based on the resource allocation information,
   wherein an ID indicating an allocation order of at least one persistent resource followed by the released specific persistent resource is changed.

6. The method of claim 5, further comprising:
   comparing a related ID with the specific ID; and
   shifting positions of slots included in the at least one persistent resource in a reverse direction by as much as a number of slots included in the released specific persistent resource, if the related ID indicates that the related ID is allocated later than the specific ID.

7. The method of claim 5, wherein the persistent resource area includes successive persistent resources along a time axis and along a frequency axis.

8. The method of claim 5, wherein the persistent resource area has a variable size.

9. A Base Station (BS) apparatus for allocating resources in a communication system, the apparatus comprising:
- an allocator configured to allocate persistent resources included in a persistent resource area to each of one or more Mobile Stations (MSs) based on a priority of a connection of each of the one or more MSs; and
- a transmitter configured to transmit resource allocation information including an IDentifier (ID) which indicates an allocation order of a related persistent resource being allocated to each of the one or more MSs and a number of slots included in the related persistent resource to the one or more MSs, and to transmit resource allocation information including an identifier (ID) which indicates an allocation order of a specific persistent resource being allocated to a specific MS and a number of slots included in the specific persistent resource to the one or more MSs if the specific persistent resource is released from the persistent resource area,
- wherein an ID indicating an allocation order of at least one persistent resource followed by the released specific persistent resource is changed.

10. The apparatus of claim 9, wherein the persistent resource area includes successive persistent resources along a time axis and along a frequency axis.

11. The apparatus of claim 9, wherein the allocator is further configured to allocate dynamic resources included in a dynamic resource area to the one or more MSs based on a priority if an allocation of the persistent resources included in the persistent resource area is completed.

12. The apparatus of claim 9, wherein the persistent resource area has a variable size.

13. A Mobile Station (MS) apparatus for allocating resources in a communication system, the apparatus comprising:
- a receiver configured to receive resource allocation information including an IDentifier (ID) which indicates an allocation order of a related persistent resource being allocated to each of one or more MSs and a number of slots included in the related persistent resource from a Base Station (BS) if the BS allocates persistent resources included in a persistent resource area to the one or more MSs based on a priority of a connection of each of the one or more MSs, and to receive resource allocation information including a specific ID which indicates an allocation order of a specific persistent resource being allocated to a specific MS and the number of slots included in the specific persistent resource from the BS, if the specific persistent resource is released from the persistent resource area; and
- a transmitter configured to transmit a signal based on the resource allocation information
- wherein an ID indicating an allocation order of at least one persistent resource followed by the released specific persistent resource is changed.

14. The apparatus of claim 13, further comprising a controller configured to compare a related ID with the specific ID and to shift positions of slots included in the at least one persistent resource in a reverse direction by as much as the number of slots included in the released specific persistent resource, if the related ID indicates that the related ID is allocated later than the specific ID.

15. The apparatus of claim 13, wherein the persistent resource area includes successive persistent resources along a time axis and along a frequency axis.

16. The apparatus of claim 13, wherein the persistent resource area has a variable size.

* * * * *